Oct. 13, 1942.  J. MORKOSKI  2,298,499
TRACTOR IMPLEMENT ATTACHMENT
Filed May 25, 1940  4 Sheets-Sheet 1

Inventor
James Morkoski
By Paul O. Pippel
Atty.

Oct. 13, 1942.                J. MORKOSKI                2,298,499
                       TRACTOR IMPLEMENT ATTACHMENT
                         Filed May 25, 1940          4 Sheets-Sheet 2

Inventor
James Morkoski
By Paul O. Pippel
Atty.

Oct. 13, 1942.    J. MORKOSKI    2,298,499
TRACTOR IMPLEMENT ATTACHMENT
Filed May 25, 1940    4 Sheets-Sheet 3

Inventor
James Morkoski
By Paul O. Pippel
Atty.

Oct. 13, 1942.  J. MORKOSKI  2,298,499

TRACTOR IMPLEMENT ATTACHMENT

Filed May 25, 1940  4 Sheets-Sheet 4

Inventor
James Morkoski
By Paul O. Pippel
Atty.

Patented Oct. 13, 1942

2,298,499

UNITED STATES PATENT OFFICE 2,298,499

TRACTOR IMPLEMENT ATTACHMENT

James Morkoski, Canton, Ill., assignor to International Harvester Company, a corporation of New Jersey Application May 25, 1940, Serial No. 337,227

12 Claims. (Cl. 97—47)

This invention relates to tractor implement attachments, and more particularly to a mechanism for lifting, stabilizing, and holding the part thereof carrying the ground-working tools in their effective ground-working positions. The invention relates further to an implement attachment with its mechanism for lifting, stabilizing, and holding the same in the ground and having parts whereby this same attachment may be converted into an attachment to provide for further ground-working tools, and to means provided in the combined attachment whereby the effecting of lifting, stabilizing, and applying pressure can likewise be effected in the same.

It is, therefore, one object of this invention to provide in an attachment means whereby added attachments may be made thereto and wherein similar effects can be given to the combined or converted attachment.

It is another and more specific object of the invention to make the connection of the connecting means at such a location near to the connection of the auxiliary attachment to the main attachment that stabilizing pressure will be distributed between the main and auxiliary frame attachments.

It is a further object of the invention to make use of means already provided on the main attachment for the connection with the stabilizing and lifting means wherein the relative movement between the auxiliary elements and the main elements will be limited upon the lifting of the combined attachment.

According to the present invention, the connecting means between the pivotally mounted main frame and the rigidly connected supporting structure on the tractor may be removed for connection to the auxiliary attachments which are pivotally connected to the main attachment to trail the same in tandem relation. On the auxiliary attachments, there is provided means for the connection of this connecting means from the supporting structure at locations near to the pivotal connection of the auxiliary attachments with the main frame. By having this connection made near to the pivotal connection, pressure will be distributed and made effective upon both the forward main frame and auxiliary tools. The means now provided on the main attachment and extending rearwardly for connection with the lifting means is located above the auxiliary attachments and adapted to be engaged by the same upon lifting of the combined attachment, whereby the combined attachment will become rigid for lifting purposes.

For other objects and for a better understanding of the invention, reference may be had to the following description taken in connection with the accompanying drawings, in which.

Figure 1:
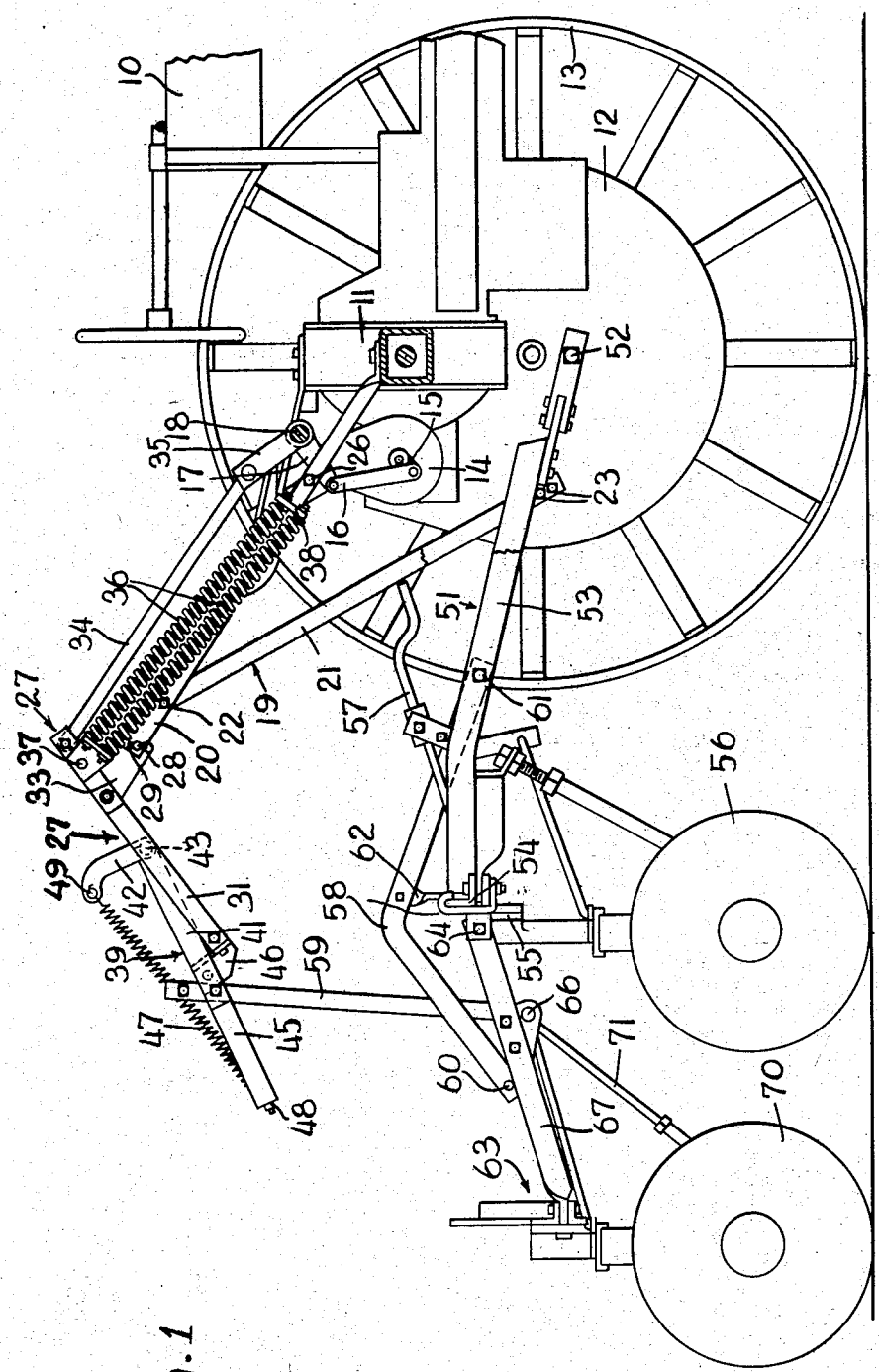
Figure 1 is a view in side elevation of the rear portion of a tractor with the implement of the present invention attached thereto.

Referring now to the figures, there is shown generally a portion 10 of a tractor having a transverse differential and rear axle housing 11 with the depending stub axle housings 12 from which are connected the tractor drive wheels 13. This tractor is of the depending housing type and is used particularly in the fields where implements of the type to be presently described are to be used. The implement of the present type is one of those particularly adapted for cultivation of sugar cane.

Associated with the tractor and connected to the transverse rear axle housing 11 is a power lift device 14 adapted to receive power from the gearing within the housing 11, and is of a type commonly in use with such tractors. The device has a crank arm 15, to which may be connected a link 16. This link 16 may be connected to an arm 17 rigidly fixed to a rock-shaft 18 to thereby effect rocking movement of the same. As the crank arm 15 makes a complete revolution, the rock-shaft will be rocked from one position to another, and then returned.

Figure 2:
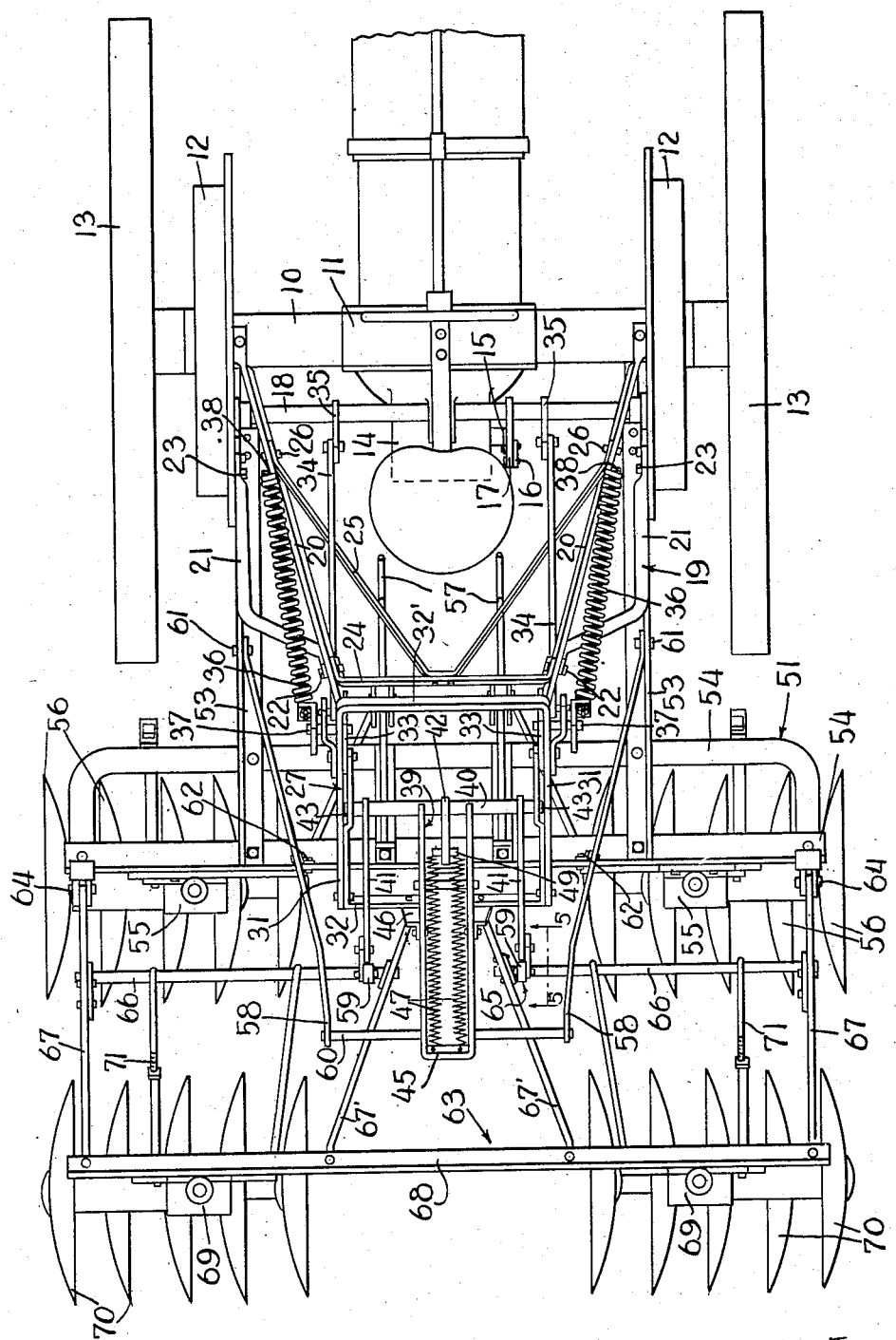
Figure 2 is a plan view of the rear portion of a tractor and of the implement attachment illustrating the present invention.
Figure 3:
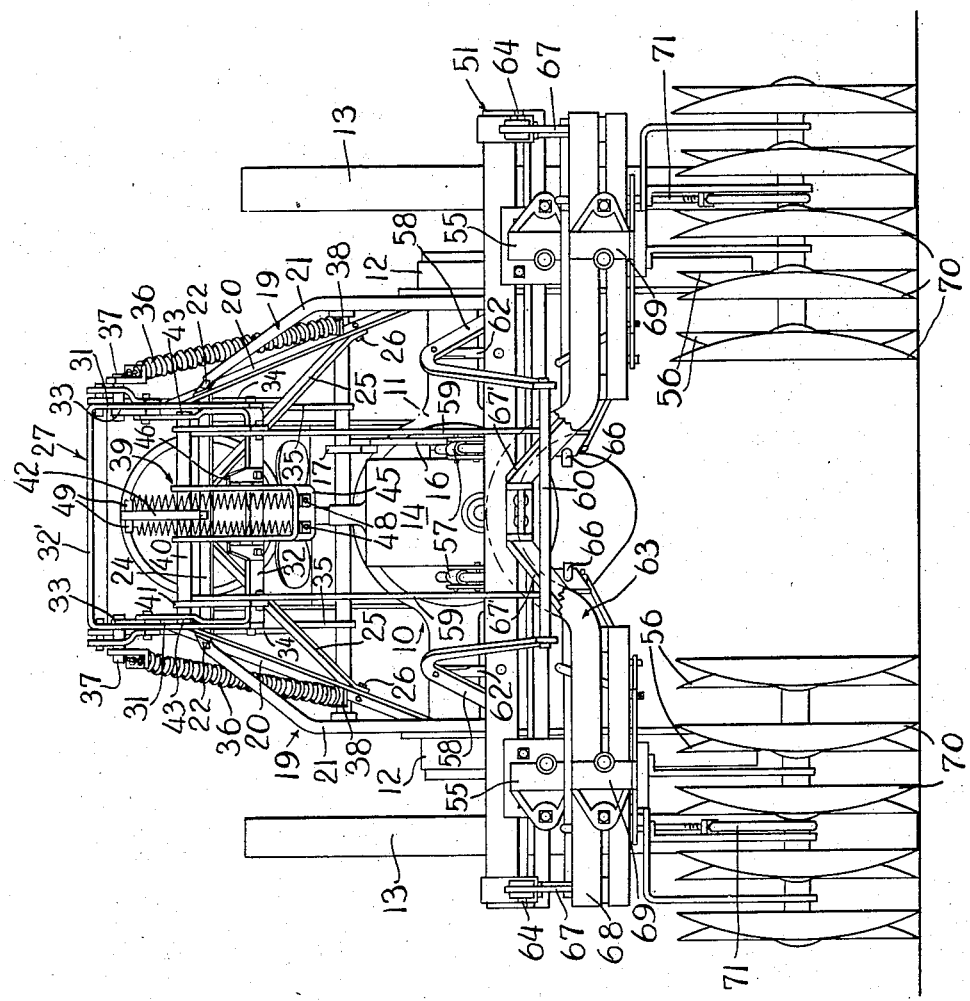
Figure 3 is a rear elevational view looking at the rear of the implement and at the rear of the tractor.

Connected to the rear of the tractor and adapted to overhang the same is a supporting structure, indicated generally at 19. This supporting structure includes rearwardly and upwardly inclined side members 20 connected at their lower ends to the top of the rear axle housing 11 and braced by means of bracing members 21 connected at a location 22 at the upper end of the side members 20 and fixed at their lower ends to the depending housings 12, as indicated at 23. The side members 20 may be braced with respect to each other by a transversely extending bracing member 24 connected to the side members by the same means as are connected the bracing members 21, as indicated at 22 (see Figure 2). There may also be provided a bracing means connected with the transverse member 24 and taking the form of a V-shaped member 25 connected to the side members at 26.

On this supporting structure 19 is pivoted a pivotal structure indicated generally at 27 and pivoted at 28 to the upper ends of the supporting side members 20 of the supporting structure 19. This pivotal connection is made by means of a shaft extending through and between the respective side members 20, and adapted to be removed therefrom by removing the cotter pins 29.

This pivotal structure 27 is fashioned like a frame and has longitudinally extending portions 31 and transversely extending portions 32 and 32'. To the longitudinally extending portions 31 are connected downwardly extending plate members 33, having openings therethrough for the attachment of the pivoted structure to the shaft indicated at 28. By these openings, through which the shaft may pass, the pivoted frame structure 27 is journaled for pivotal movement on the supporting structure 19.

The pivotal structure 27 may be connected by means of operating links 34 with arms 35 rigid with the rock-shaft 18, whereby the pivoted structure may be rocked about the pivot 28 by means of the power lift device 14. To assist the power lift device during the lifting operation, there has been provided two sets of springs indicated at 36 and located at each side of the supporting structure, respectively. These spring devices 36 are connected directly to the pivoted structure 27, as indicated at 37, and their rearward ends are anchored to the side frame members 20 of the supporting structure, as indicated at 38. These spring devices are not sufficient to effect actual lifting, but do materially assist in the lifting operation by the power lift device 14.

Figure 4:
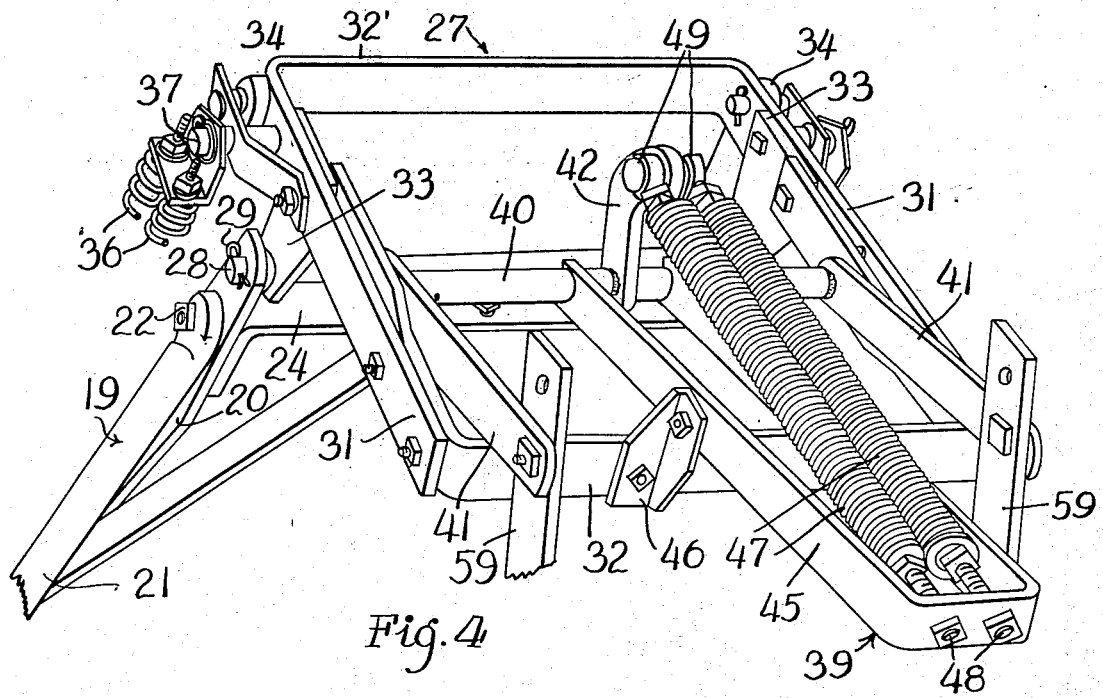
Figure 4 is a perspective view of the combined lifting, stabilizing, and pressure means carried by the supporting structure; and, Figure 5 is a detail view, taken along the lines 5—5 of Figure 2, showing the means for connection with one of the auxiliary attachments.

Connected to the pivoted structure 27 is a stabilizer and pressure spring device indicated generally at 39. Referring particularly to Figures 1 and 4, it will be noted that this device comprises a shaft 40 which is pivoted to the side frame structures 31 of the pivoted frame structure 27, and to this shaft there are rigidly connected spaced lifting arms 41 and an arm member 42 located midway between the ends of the shaft 40 and extending substantially at right angles with respect to the arm members 41. When the lifting operation is effected, the lifting arm members 41 will contact with the transverse portion 32 of the pivoted structure 27, whereby lifting may be effected, the shaft 40 being pivotally connected as at 43 with the longitudinally extending side frame portions 31 of the pivoted structure 27.

Since the respective arm members 41 are rigid with the shaft 40, it will be apparent that stabilization may be afforded through the shaft 40 upon the rearward ends of the arms 41 being connected with an implement at laterally spaced locations on the same. This will be more apparent as the description proceeds.

To this shaft 40 there is journaled at their forward ends the legs of a U-shaped member 45. This U-shaped member extends rearwardly and is fixed with respect to the transverse portion 32 of the pivoted frame structure 27 by means of angle brackets 46. The U-shaped member 45 extends rearwardly to a substantial distance beyond this transverse portion 32, at which location there is adjustably connected the ends of pressure spring means 47, as indicated at 48. The forward ends of this spring means 47 is connected to the arm 42, as indicated at 49. These springs tend to maintain the arms 41 in rigid relation and against the transverse portion 32 of the pivoted structure 27, for reasons which will be more apparent and hereinafter described.

Forming another part of the attachment is a main tool-carrying frame 51 pivoted to the depending housing 12 by means indicated at 52 and comprising generally two longitudinally extending members 53, to the rearward ends of which are connected a pair of transversely extending members 54. These transversely extending members have brackets 55 for the pivotal connection thereto of a gang of disks 56. As means for effecting angling of these gangs 56 there is provided a manual adjustment means 57. These gangs 56 are spaced with respect to each other to provide an opening between the same for the passage of the row crop. The gangs work on both sides of the row crop to cultivate the soil. Such an implement attachment 51 has been used heretofore, and means have been provided including longitudinally extending members 58 adapted to overhang the rear portions of the main attachment frame for the connection of the same to the lifting means by means of the links 59. When the main attachment frames have been used alone, the same are lifted by the operation of the lifting means through the connecting links 59 which would be attached to the longitudinally extending members 58 by means of a shaft 60 located in the rear ends of the longitudinally extending members 58.

Figure 5:
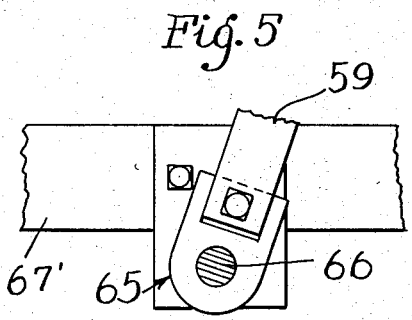

According to the present invention, use is made of these longitudinally extending members 58 which are rigidly connected to the side frame members 53, respectively, as indicated at 61, and to one of the transverse frame members 54, as by means of a strap 62. The connecting links may be disconnected from the shaft 60 of the longitudinal members 58 for connection with an auxiliary frame structure 63 pivoted to the main frame structure 51 by means of bolts 64. This connection with which the links 59 may be made with the auxiliary frames is shown at 65 and more clearly in Figure 5, and includes a shaft 66 extending between side frame and inner frame members 67 and 67' of the auxiliary attachment frame 63. To the rearward ends of these frame members 67 and 67' of the auxiliary frame 63, there is connected a transversely extending member 68 having connected thereto a pair of spaced brackets 69, to which may be pivotally connected auxiliary disk gangs 70. These disk gangs may be angled by means of an adjustable drag-rod 71 connected forwardly to the shaft 66. It will be noted that the disk gangs 70 of the auxiliary attachment oppose the respective disks of the disk gangs 56 of the main frame attachment 53.

It should be noted that the connecting links 59 from the supporting structure are connected to the auxiliary frame at locations which are near to their pivotal connections 64 with the main frame attachment 53. By having these connections made at this location, the pressure derived from the pressure springs 47 of the stabilizing and pressure structure 39 will be distributed so that it will be applied to both the disks on both the main frame and auxiliary attachments. Further, it should be noted that, since the connecting links 59 are connected in spaced relation, the transverse frame structures will be stabilized transversely thereon to retain the frame attachments against lateral and transverse tilting. Any motion received by one side of the frame will thereby be transmitted to the other side of the frame through the connecting link 59 by way of the arms 41, which are interconnected by the shaft 40.

It should now be further noted that, since the shaft 40 has rigidly connected thereto the arm 42, the spring means 47 acting upon the arm 42 will tend also to maintain the arms 41 against the transverse portion 32 of the pivoted frame structure and at the same time to thereby apply pressure to the attachments. Any tendency for the combined implement attachments to raise out of the ground will be resisted by this spring device 47.

By having the longitudinally extending members 58 adapted to extend rearwardly, they are in a location such that the rod 60 interconnecting the ends of the same will be engaged by the inner frame members 67' upon operation of the pivoted structure 27 by the power lift device 14 to effect lifting of the combined implement attachment. Thus it will be apparent that the longitudinally extending members 58, normally utilized for the connection with the main frame attachment of the connecting links 59, may be utilized for limiting the pivotal movement between the auxiliary attachment frame and the main attachment frame, whereby lifting of these frames jointly may be effected. The auxiliary attachment frame will be pivoted for a short interval until its members 67' engage with the shaft 60 on the ends of the longitudinally extending arms 58, and then the main frame attachment will be lifted with the same.

It should now be apparent that there has been provided an arrangement for connecting an auxiliary attachment to a main frame attachment so that a combined tandem arranged cultivator will be effected. The main frame cultivator attachment will thereby be converted into a double frame, tandem cultivator attachment and the means on the main attachment frame ordinarily used for connection thereto of a connecting link means will be utilized for limiting the upward movement of the auxiliary frame with respect to the main frame to thereby permit lifting of the combined attachment.

While various changes may be made in the detailed construction of this invention, it shall be understood that such changes shall be within the spirit and scope of the present invention as defined in the appended claims.

What is claimed is:

1. In combination, a tractor having a transverse rear axle structure, an implement attachment connected to the tractor and comprising a supporting structure extending rearwardly from the rear axle structure and having lifting means associated therewith, a main tool-frame pivoted to the tractor for vertical movement and adapted to extend rearwardly beneath the supporting structure, an auxiliary frame pivoted to the main frame for independent vertical movement, means for connecting the auxiliary frame to the lifting means associated with the supporting structure, and means automatically coming into play to prevent relative movement between said frames upon operation of the lifting means whereby both of said frames will be lifted together about the pivot connection of the main frame with the tractor.

2. In combination, a wheeled frame, a pair of ground-working tool-carrying frames pivotally connected together for relative movement with respect to each other in their ground-working position, and to the wheeled frame to be drawn thereby, pressure means adapted to react against the wheeled frame, and means for connecting the pressure means to the tool-carrying frames in such relation to the pivotal connection therebetween that the pressure from the pressure means will be distributed between the frames.

3. In combination, a wheeled frame, a main tool-carrying frame pivoted to the wheeled frame for vertical movement with respect thereto, an auxiliary frame pivotally connected to the main frame for vertical movement with respect to the same, pressure means adapted to react against the wheeled frame, and means for connecting the pressure means to one of said frames near to the pivotal connection between the same, whereby the pressure from the pressure means will be distributed between the two frames.

4. In combination, a tractor having a rear axle structure, an implement attachment comprising a supporting structure rigidly connected to the tractor and extending rearwardly therefrom and a tool-carrying structure including a main frame pivotally connected to the tractor for vertical movement and extending rearwardly beneath the supporting structure, an auxiliary tool-carrying frame pivotally connected to the main frame for vertical movement with respect thereto, pressure means adapted to react against the supporting structure, and means for connecting the pressure means to one of said frames near to the pivotal connection between the same, whereby the pressure therefrom will be distributed between the two frames.

5. In combination, a tractor having a rear axle structure, an implement attachment comprising a supporting structure rigidly connected to the tractor and extending rearwardly therefrom and a tool-carrying structure including a main frame movably connected to the tractor for vertical movement and extending rearwardly beneath the supporting structure, an auxiliary tool-carrying frame independently movably connected to the main tool-carrying frame for vertical movement with respect thereto, pressure means adapted to react against the supporting structure, and means for connecting the pressure means to the auxiliary tool-carrying frame, the pressure therefrom being distributed between all of the frames.

6. In combination, a tractor, a main tool-carrying frame pivoted to the tractor for vertical movement with respect thereto, an auxiliary tool-carrying frame pivoted to the main tool-carrying frame for vertical movement with respect thereto, and stabilizer means associated with the tractor to react thereagainst and connected to the auxiliary frame near to its pivotal connection with the main frame whereby both the main and auxiliary frames will be stabilized against lateral transverse tilting with respect to the tractor.

7. In combination, a tractor, a main tool-carrying frame pivoted to the tractor for vertical movement with respect thereto, an auxiliary tool-carrying frame pivoted to the main tool-carrying frame for vertical movement with respect thereto, pressure means for both of said frames associated with the tractor to react against the same, means for connecting the pressure means to the auxiliary frame near to its pivotal connections with the main frame whereby the pressure will be distributed between both of the frames, and said pressure means and means for connecting the same to the frames being so constructed and connected as to serve to stabilize the frames against lateral transverse tilting with respect to the tractor.

8. In combination, a tractor having lifting means thereon, a tool-carrying frame pivoted to the tractor for vertical movement with respect thereto, pressure means associated with the lifting means, means for connecting the pressure means to the main frame at laterally spaced locations therealong, and said pressure means being so constructed as to provide stabilizing pressure through the connecting means whereby the tool-carrying frame is stabilized against lateral transverse tilting with respect to the tractor.

9. In combination, a tractor having lifting means thereon, a main tool-carrying frame pivotally connected to the tractor for vertical movement with respect thereto, an auxiliary frame pivotally connected to said main frame for relative movement with respect thereto, combined pressure and stabilizing means carried by the lifting means, means for connecting the auxiliary frame to the pressure and stabilizer means and at locations near to their pivotal connections with the main frame, whereby both of said frames will have pressure distributed between them and will be stabilized against lateral tilting with respect to the tractor.

10. In combination, a tractor having lifting means thereon, a main tool-carrying frame pivotally connected to the tractor for vertical movement with respect thereto, an auxiliary frame pivotally connected to said main frame for relative movement with respect thereto, and at laterally spaced locations therealong respectively, combined pressure and stabilizing means carried by the lifting means, means for connecting the auxiliary frame to the pressure and stabilizer means and at locations near to their pivotal connections with the main frame, whereby all of said frames will have pressure distributed between them and will be stabilized against lateral tilting with respect to the tractor, and means for preventing relative pivotal movement between the frames upon operation of the lifting means to thereby effect lifting through said connecting means, whereby said connecting means serves for lifting as well as for applying pressure and stabilizing force to said frames.

11. In combination, a tractor having a lifting means, a main cultivating attachment connected to the tractor for vertical movement with respect thereto including means serving normally for the connection of the lifting means thereto, an auxiliary cultivating attachment adapted to be attached to the main cultivating attachment for vertical movement with respect thereto and having means for the attachment thereto of said lifting means upon the auxiliary attachment being connected to the main attachment to convert the main attachment into an attachment which will give combined effect, said connecting means for the main frame serving in the combined attachment as means for preventing relative movement between the auxiliary and main attachments upon operation of the lifting means to lift the combined attachment.

12. In combination, a tractor having lifting means associated therewith, a main tool-carrying frame attachment pivotally connected to the tractor for vertical movement with respect thereto, and having means extending beyond the length of the same for connection with the lifting means, an auxiliary tool-carrying frame adapted to be pivotally connected to the main frame for vertical movement with respect thereto and to extend beneath the lifting connection for the main frame, whereby said main frame attachment will be converted into an attachment which will be given a combined effect, said auxiliary frame having means for the connection of the lifting means and said connection means for the main frame adapted to be engaged by the auxiliary frame upon operation of the lifting means to thereby limit the relative movement of the frame whereby lifting of the combined frames may be effected.

JAMES MORKOSKI.